(12) United States Patent
Haimer

(10) Patent No.: US 9,889,507 B2
(45) Date of Patent: Feb. 13, 2018

(54) PRE-STRESSING DAMPING SYSTEM

(71) Applicant: Franz Haimer Maschinenbau KG, Hollenbach-Igenhausen (DE)

(72) Inventor: Franz Haimer, Hollenbach-Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 162 days.

(21) Appl. No.: 14/654,830

(22) PCT Filed: Dec. 20, 2013

(86) PCT No.: PCT/EP2013/077737
§ 371 (c)(1),
(2) Date: Jun. 22, 2015

(87) PCT Pub. No.: WO2014/096380
PCT Pub. Date: Jun. 26, 2014

(65) Prior Publication Data
US 2015/0336179 A1     Nov. 26, 2015

(30) Foreign Application Priority Data

Dec. 21, 2012  (DE) .................. 10 2012 025 075
May 21, 2013   (DE) .................. 10 2013 105 171

(51) Int. Cl.
*B23B 31/117*     (2006.01)
*B23B 31/30*      (2006.01)
(Continued)

(52) U.S. Cl.
CPC .......... *B23B 31/305* (2013.01); *B22F 3/1055* (2013.01); *B22F 5/10* (2013.01);
(Continued)

(58) Field of Classification Search
CPC ............. B23B 31/1177; B23B 31/1178; B23B 31/305; Y10T 279/1216
See application file for complete search history.

(56) References Cited

U.S. PATENT DOCUMENTS 3,540,346 A * 11/1970 Jones .................... B23B 31/305
                                                            408/239 R
5,127,780 A *  7/1992 Massa .................. B23B 31/305
                                                              279/2.01

(Continued)

FOREIGN PATENT DOCUMENTS

CN        1988975 A       6/2007
DE     2738527 A1 *  3/1979 ......... B23B 31/1177
(Continued)

*Primary Examiner* — Eric A Gates

(57) ABSTRACT

A tool holder having a tool receptacle for chucking a tool shaft by frictional engagement, in which the tool receptacle comprises a plurality of annular clamping surfaces spaced apart from one another, which are intended for retaining the tool shaft by nonpositive engagement and are embodied on the inner circumference of a tube part, and the tube part has a recess in the material for varying its clamping action; the recess in the material is embodied by a plurality of annular channels extending in the circumferential direction, which are each separated from the tool receptacle by a resilient wall portion, which on its side facing away from the channel embodies the respective clamping surface.

8 Claims, 6 Drawing Sheets

(51) Int. Cl.
  *B23B 31/02* (2006.01)
  *B23B 31/11* (2006.01)
  *B23B 31/20* (2006.01)
  *B23C 5/26* (2006.01)
  *B22F 3/105* (2006.01)
  *B22F 5/10* (2006.01)
  *B22F 7/08* (2006.01)

(52) U.S. Cl.
  CPC ............... *B22F 7/08* (2013.01); *B23B 31/02* (2013.01); *B23B 31/11* (2013.01); *B23B 31/1177* (2013.01); *B23B 31/1178* (2013.01); *B23B 31/1179* (2013.01); *B23B 31/201* (2013.01); *B23B 31/202* (2013.01); *B23C 5/26* (2013.01); *B23B 2250/12* (2013.01); *B23B 2250/16* (2013.01); *B23B 2265/326* (2013.01); *Y02P 10/295* (2015.11); *Y10T 279/1216* (2015.01); *Y10T 279/17931* (2015.01); *Y10T 279/17957* (2015.01); *Y10T 407/1946* (2015.01)

(56) References Cited

U.S. PATENT DOCUMENTS

| | | | | |
|---|---|---|---|---|
| 5,286,042 | A * | 2/1994 | Laube | ............... B23B 29/03421 279/133 |
| 5,301,961 | A | 4/1994 | Wozar | |
| 8,083,445 | B2 * | 12/2011 | Hyatt | ............... B23B 31/02 408/58 |
| 9,289,831 | B2 * | 3/2016 | Herud | ............... B23B 31/12 |
| 2003/0047889 | A1 | 3/2003 | Gerber | |
| 2004/0149738 | A1 | 8/2004 | Haimer | |
| 2009/0179368 | A1 | 7/2009 | Haimer | |
| 2011/0156363 | A1 | 6/2011 | Haimer | |
| 2011/0266756 | A1 | 11/2011 | Haimer | |
| 2013/0001896 | A1 * | 1/2013 | Herud | ............... B23B 31/005 279/4.07 |
| 2014/0197607 | A1 * | 7/2014 | Doi | ............... B23B 31/305 279/4.03 |
| 2015/0028548 | A1 * | 1/2015 | Haimer | ............... B23B 31/005 279/4.06 |

FOREIGN PATENT DOCUMENTS

| | | | | |
|---|---|---|---|---|
| DE | 3517246 | C2 | 1/1986 | |
| DE | 9115854 | U1 | 2/1992 | |
| DE | 29603751 | U1 | 6/1996 | |
| DE | 19926209 | C1 | 2/2001 | |
| DE | 20023140 | U1 | 1/2003 | |
| DE | 10221507 | C1 * | 10/2003 | ........... B23B 31/305 |
| DE | 202006002763 | U1 | 3/2007 | |
| DE | 20321408 | U1 | 7/2007 | |
| DE | 102008039197 | A1 * | 2/2010 | ........... B23B 31/028 |
| DE | 102008060374 | A1 | 3/2010 | |
| EP | 1353768 | B1 | 5/2005 | |
| EP | 1882537 | A1 * | 1/2008 | ........... B23B 31/302 |
| EP | 2174736 | A1 * | 4/2010 | ........... B23B 31/305 |
| EP | 2177296 | A1 * | 4/2010 | ........... B23B 31/305 |
| EP | 2004351 | B1 | 7/2011 | |
| EP | 1291103 | B1 | 8/2011 | |
| GB | 2162098 | A | 1/1986 | |
| WO | 0160556 | A1 | 8/2001 | |
| WO | 2010022875 | A1 | 3/2010 | |

* cited by examiner

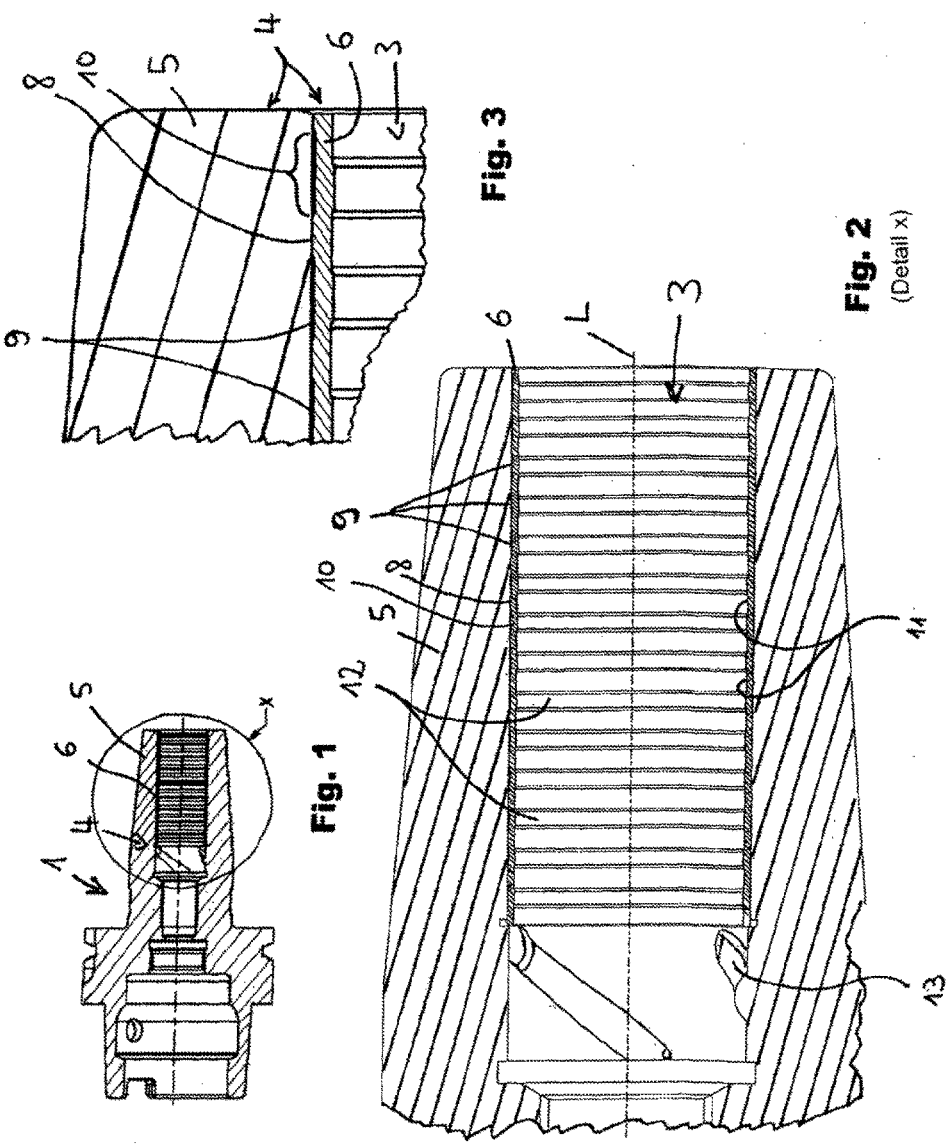

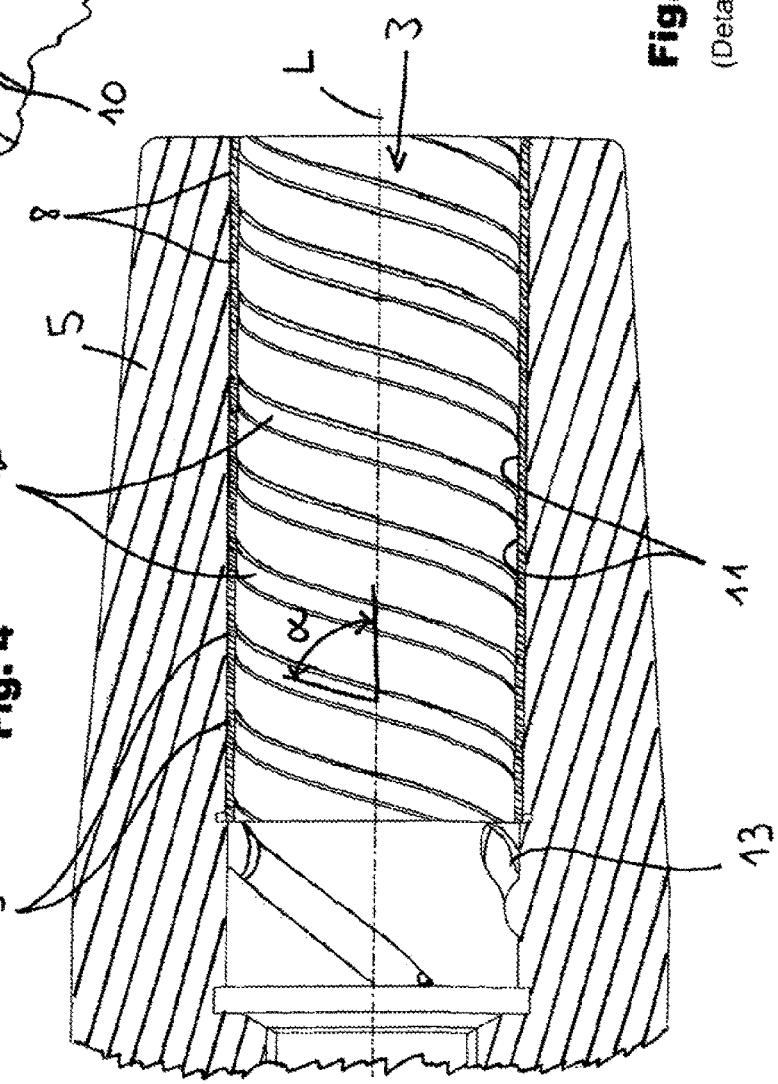
Fig. 4
Fig. 5
(Detail x)
Fig. 6

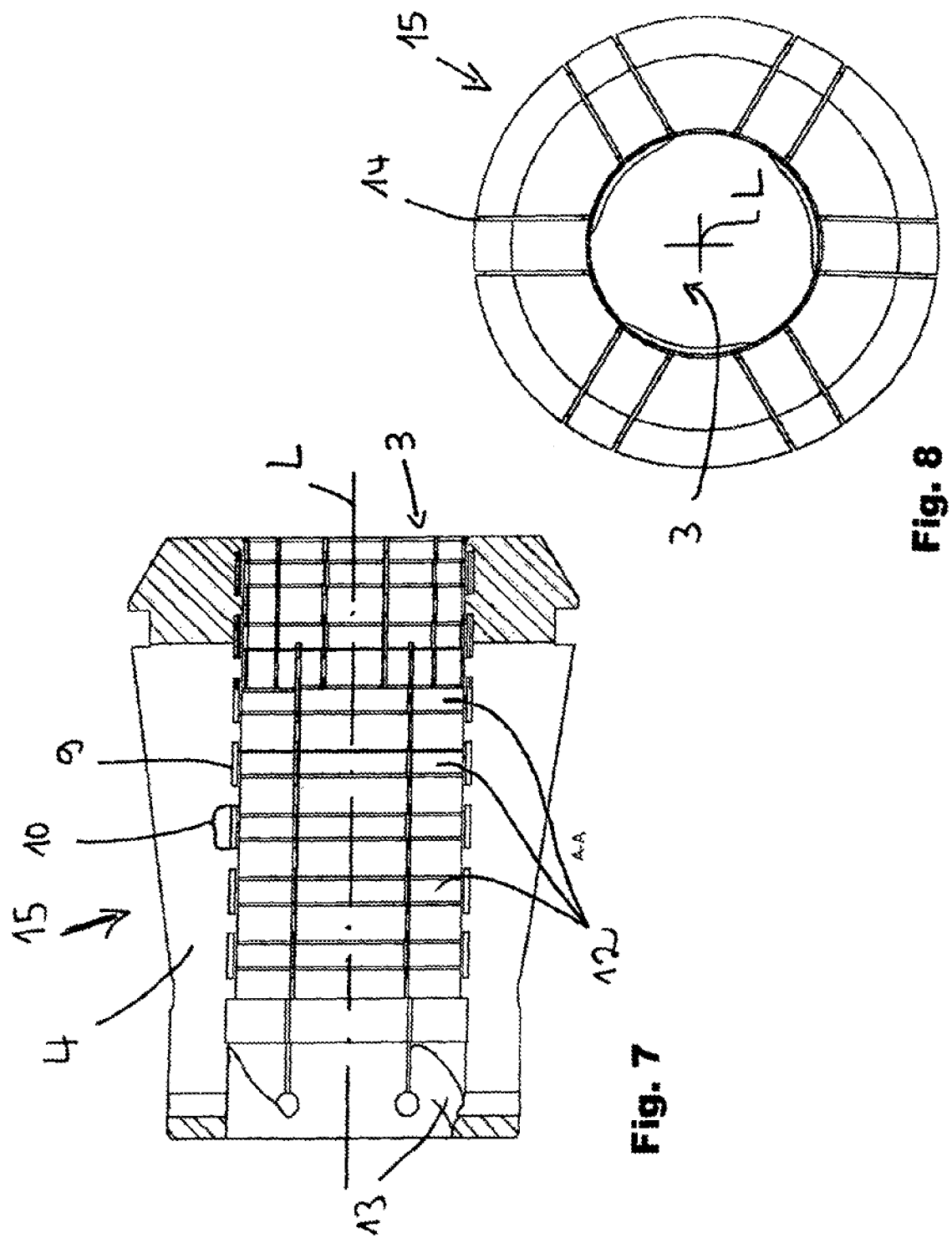

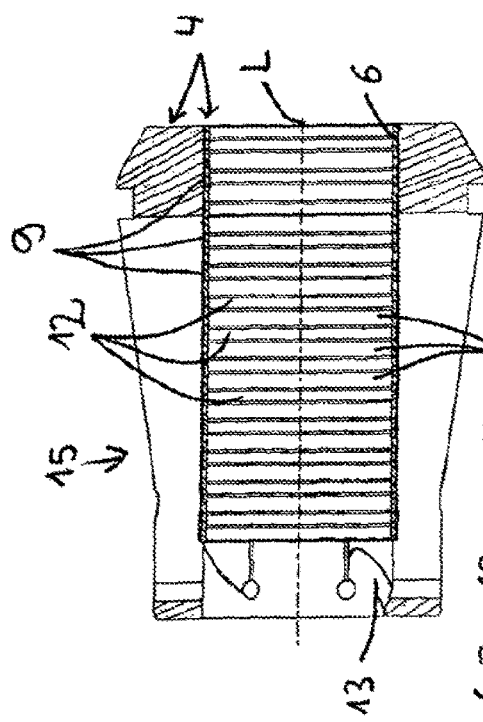
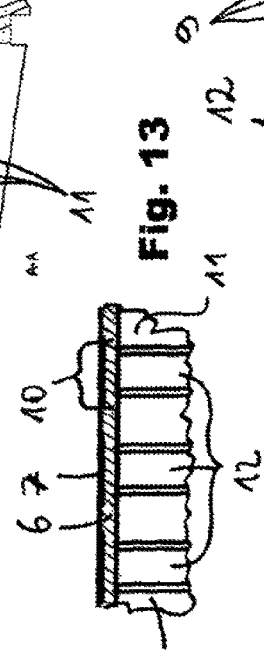
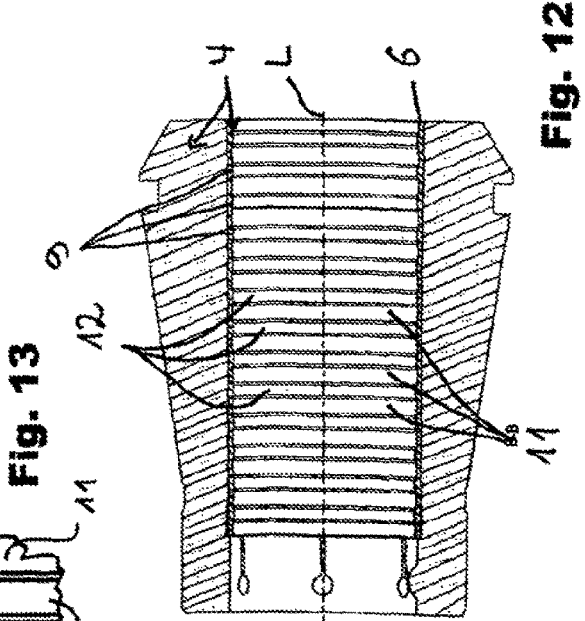
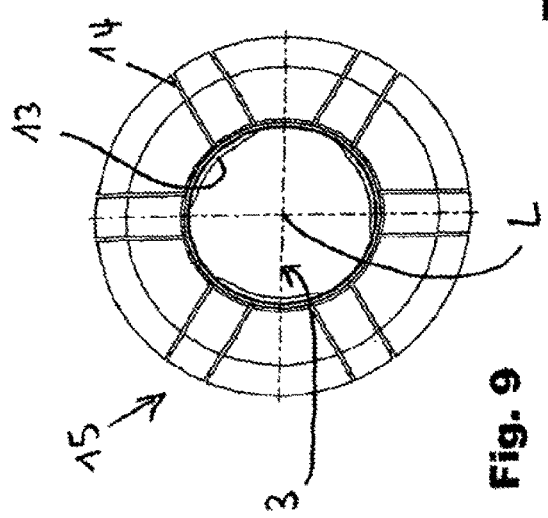
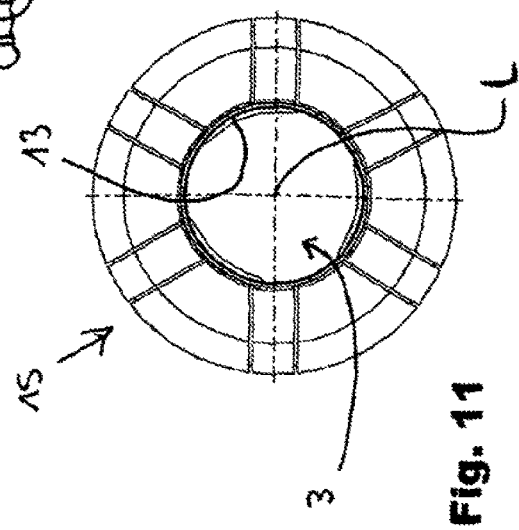

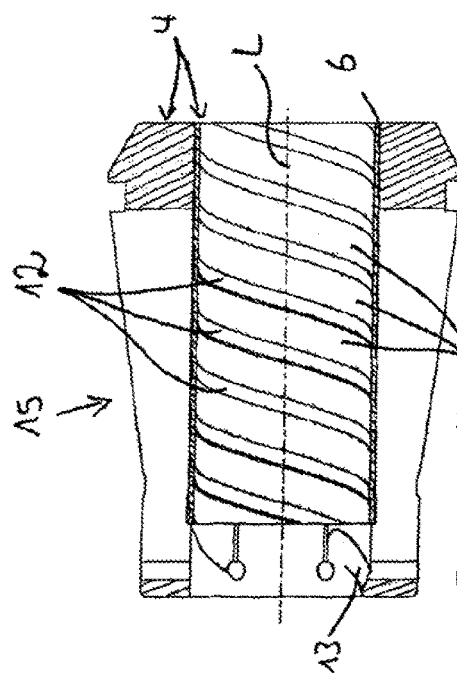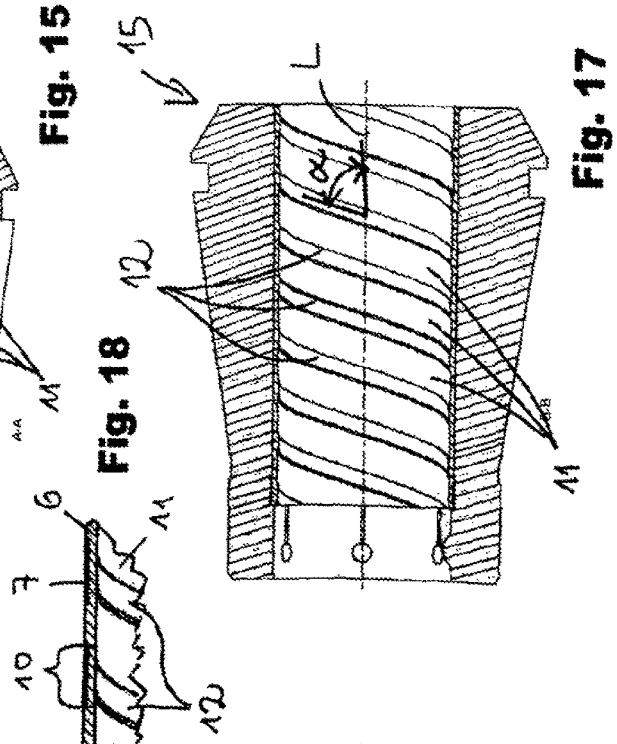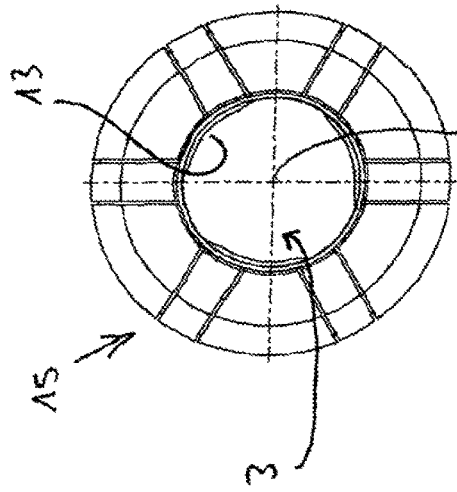

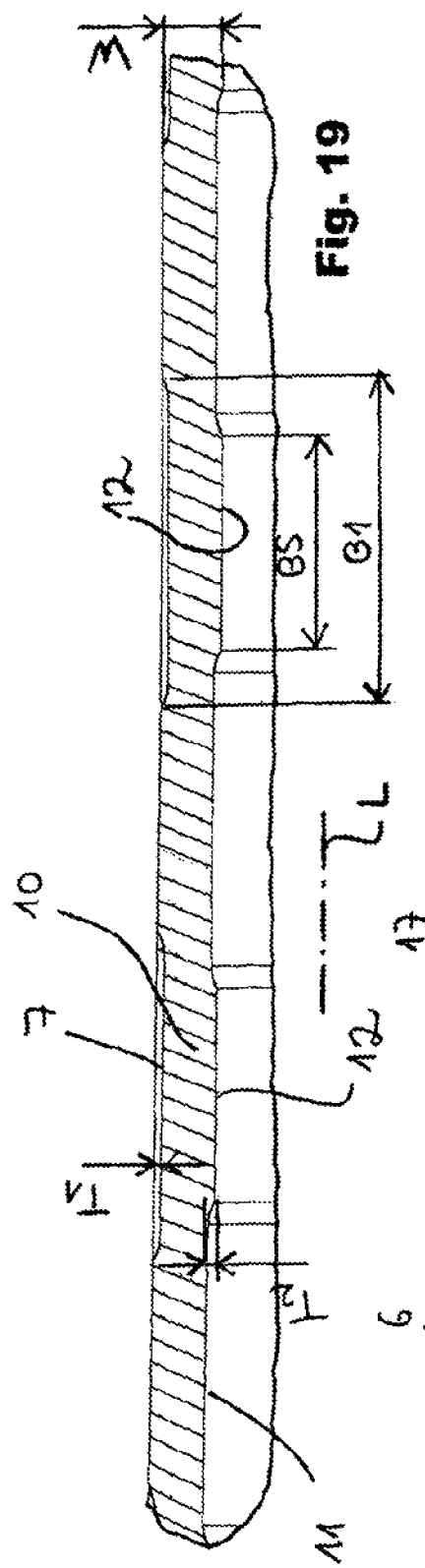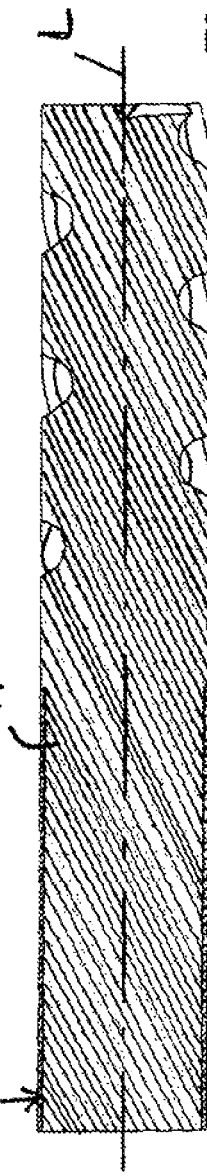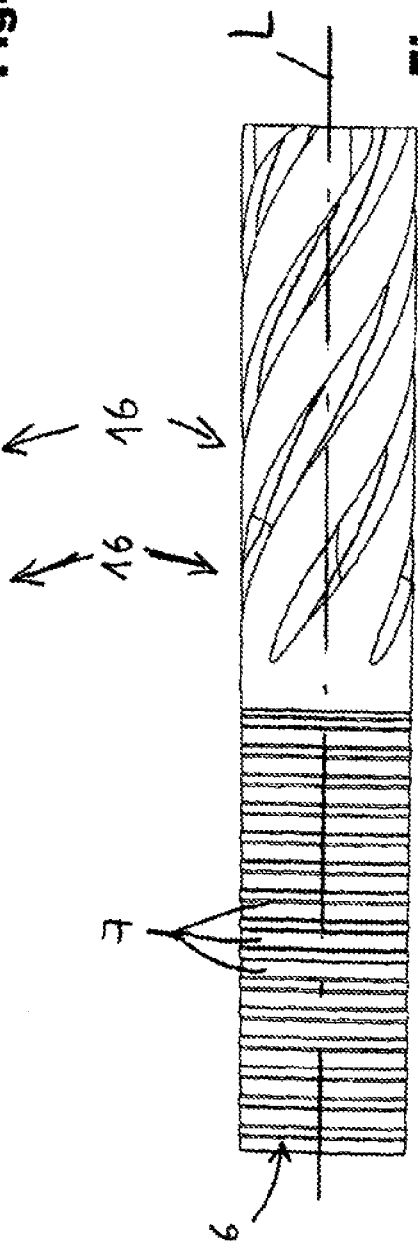

PRE-STRESSING DAMPING SYSTEM

FIELD OF THE INVENTION

The invention relates to a tool holder for a tool, in particular in the form of a drill, milling cutter or reamer, that is rotatable about an axis of rotation.

BACKGROUND OF THE INVENTION

It is known for the shaft of such a tool to be held in a central receiving opening of an annular, self-contained part, most often embodied as a tube part, of a tool holder by means of a press fit. This tube part forms the end toward the tool of a tool holder of otherwise conventional design.

This part or tube part of the tool holder can be widened by heating so far in the radial direction that the cold shaft of the tool can be thrust into the tube part or pulled out of it. As soon as the tube part has cooled down again, a pressure bond forms between it and the shaft of the tool, by means of which pressure bond the tool is reliably fixed in the tool holder (shrink-fit technology; see for example EP 1 353 768 B1).

Alternatively, chucking can also be done hydraulically. For that purpose, inside the aforementioned tube part of the tool holder, a hydraulic clamping device is provided, which upon imposition of hydraulic pressure reduces its inside diameter embracing the tool shaft and thus chucks the tool shaft by frictional engagement.

As a third alternative, there is the possibility of bringing about the pressure required for secure chucking of the tool shaft by frictional engagement purely mechanically as well, for instance by means of spring collet chuck per DIN ISO 15488 or EP 1 291 103, or roller jaw chucks per DE 35 172 46.

Collet chucks of the type described have proved themselves very well in practice.

In general in collet chucks of the described type, there is the problem that under unfavorable circumstances, because of reaction forces that originate at the cutting edges of the tool that are exposed to rapidly alternating stresses, vibration is induced, which not infrequently is in or near the resonant range. This vibration can make itself felt so markedly in the complete system comprising the tool, collet chuck and machine tool, that the cutting speed and/or the feeding speed have to be reduced, which impairs the performance of the concrete system and is therefore unwanted.

It is known that the tendency to vibration of such a complete system can be favorably affected in some cases by "softer" chucking of the tool.

It is now the object of the present invention to disclose a means which makes chucking the tool in a way that especially favorably affects the vibration behavior of the tool, without making compromises in the machining precision.

SUMMARY OF THE INVENTION

A first alternative way of attaining the stated object, according to the invention, comprises a tool holder having a tool receptacle for chucking a tool shaft by frictional engagement, in which the tool receptacle comprises a plurality of annular clamping surfaces spaced apart from one another, which are intended for retaining the tool shaft in a press fit and are embodied on the inner circumference of a tube part, and the tube part has a recess in the material for varying its clamping action. The recess in the material is embodied by a plurality of annular channels extending in the circumferential direction, which are each separated from the tool receptacle by a resilient wall portion, which on its side facing away from the channel embodies the respective clamping surface. The depth, measured in the radial direction, of each channel is very slight, in fact <0.1 mm. In this way, the resilient wall portion initially behaves markedly softly, which in particular in cooperation with the orientation of the channels in the circumferential direction affects the vibration behavior quite favorably. Nevertheless, the construction does not have an overly soft characteristic, since the resilient wall portion, with increasing load, soon braces itself on the tubular portion located behind it in the radial direction and then has a substantially more robust characteristic.

Surprisingly, it has been demonstrated that annular channels that extend in the circumferential direction in the tube part and are ideally "endless" or have no interruptions, are superior to other structures, such as a number of bores that have been made in the tube part in the direction parallel to the axis of rotation. This is among other reasons because such structures as the bores just mentioned, parallel to the axis of rotation, have the effect that the rigidity of the thus-treated tool holder, compared to a force engaging radially from a certain direction, depends on the actual rotary position of the tool holder, which in some instances of use—depending on the current load and rpm—can even have a vibration-inducing effect.

Furthermore, it is also surprisingly been found that simple grooves, which are punched in from the side of the tool receptacle and therefore are open toward the side of the tool receptacle, are capable of producing only a significantly weaker effect on the chucking characteristic than the channels of the invention, which are located in the interior of the tube part and are completely closed off from the tool receptacle.

A second alternative for attaining the stated object according to the invention comprises a tool holder with a tool holder having a tool receptacle for chucking a tool shaft by frictional engagement, in which the tool receptacle comprises at least one helical clamping surface, which is intended for retaining the tool shaft by nonpositive engagement and is embodied on the inner circumference of a tube part, and the tube part has a recess in the material for varying its clamping action. The recess in the material is embodied by at least one channel extending essentially in the circumferential direction along a helical line, which channel is separated from the tool receptacle by a resilient wall portion, which on its side facing away from the channel embodies the respective clamping surface. Preferably, the channel winds around the tool receptacle opening multiple times in the circumferential direction, ideally at least three times. Instead of a single channel, a plurality of channels may also be provided, which then as it were form a multi-course thread in the tube part.

This kind of threadlike arrangement also leads to the rigidity of the thus-designed tool holder, compared to a force radially engaging from a certain direction, does not depend significantly on the current rotary position of the tool holder; it is especially advantageous here that the rigidity of the tool holder does not vary suddenly in the course of its rotation.

Angle α, of the tangent, relative to the central longitudinal axis of the helical line, along which tangents the channel extends around, and of the axis about which the tool holder rotates as intended, is advantageously <60°, in protection of said straight lines onto one another.

A preferred embodiment of the invention is distinguished in that the resilient wall portion is thin-walled in the radial direction and preferably has a wall thickness <2 mm, ideally <1 mm. This lends the resilient wall portion an elasticity, which has an especially advantageous effect on the vibration behavior—especially whenever the possibility exists that the resilient wall portion, under the influence of the forces occurring in operation, yields only a defined distance in the radial direction and then is braced on the tubular portion located behind it in the radial direction, as if being compressed until it is virtually a block. This prevents the chucking of the tool shaft from becoming too soft to be able to withstand the loads occurring in operation.

Within the scope of another preferred embodiment, it is provided that the width of the channel that is spanned by the resilient wall portion, which separates the channel from the tool receptacle, is greater, preferably by at least 25%, than the width of the clamping surface that is embodied on the resilient wall portion, in each case viewed in the direction of the longitudinal axis L of the tool holder. This permits especially good utilization of the effect of the resilient wall portion.

Preferably, the depth, measured in the radial direction, of the respective channel is very slight, in fact so slight that it is <0.075 mm, which is even better. In this way, the resilient wall portion first behaves extremely softly, which especially in cooperation with the orientation of the channels in the circumferential direction has a very favorable effect on the vibration behavior. Nevertheless, the construction has a characteristic that is not too soft, since with increasing load, the resilient wall portion soon braces itself on the tube part located behind it and then has a substantially more-robust characteristic.

Preferably, the width, measured in the direction of the axis of rotation L, of the respective channel is greater by a factor of at least 10, and ideally even by a factor of 20, than the depth of the channel measured in the radial direction. Such an embodiment promotes the effect already addressed, that the resilient wall portion can be compressed until it is virtually a block in the manner described, without the occurrence of local loads in the vicinity of the resilient wall portion that are harmful.

Within the scope of a preferred embodiment, it is provided that the tube part of the tool holder is embodied in two parts and comprises one tubular portion, which as a rule is an integral component of the tool holder, and a bush, fixed in the tubular portion, in the outer circumferential surface of which bush one or more grooves which definitively form the channel or channels are machined. With the aid of this kind of two-part design, the channels of the invention can be produced especially rationally, although a different kind of production is also conceivable, for instance by powder metallurgical methods, which make it possible to produce corresponding channels integrally in a one-piece tube part. In either case, this kind of two-part design has the advantage that different variants and model series can be achieved quite easily, because raw blanks that are identical or only slightly different for the tool holder can be equipped with different bushes that each affect the desired damping characteristic.

In a preferred embodiment, it is provided that the channels or channel-forming grooves preferably machined into the outer circumferential surface of the bush are filled, preferably completely, with a nonferrous metal, ideally copper, or a nonmetal, ideally a compressible soft elastomer or a compressible rubber, or otherwise a plastic, or a fluid, preferably oil.

The characteristic of the channel-forming grooves can be adjusted very finely by providing that the grooves are filled, for instance with the aid of galvanic deposition, entirely or partly with a nonferrous metal, whereupon the entire outer circumference (coated mostly continuously by the deposition) of the bush is ground to a predetermined fit size, usually such that at the end, the deposited material can be found only in the grooves. The bush is then built into the tube part and preferably fixed in final form there.

Otherwise, the possibility also exists of placing the bushes in suitable extrusion molds and of spraying the channel-forming grooves with a plastic composition or an elastomer or a rubber elastomer. Then the outer circumference of the bush is polished (as described above) and thus brought to its fit size. In the preferred use of suitably precise injection molds, in fact only the particular groove intended for this is sprayed with plastic etc., but the bush retains its precisely fabricated diameter.

Otherwise, the possibility also exists of building the bush into a tool holder that has been immersed in an oil bath. In this manner, a durable filling of the channels with oil that has a damping action is achieved.

It is entirely ideal if the bush is made from an especially strongly vibration-damping metal alloy ("high-damping metal"), of the kind offered at present for instance by the company known as Les Bronze d'Industrie, 26 rue de la Republique, 57360 Amneville, France under the trademark EXIUM® AM. In more general terms, a high-damping metal is understood to be a metal or metal alloy that in the radial direction of the bush exhibits a damping property that is better than conventional tool steel by at least 15% and ideally by at least 25%.

Preferably, the bush, on its face end toward the free end of the tool holder, is welded to the tool holder. This simplifies the manipulation of the tool holder, since it is ensured that the bush on being installed in and removed from the respective tool is not pulled out of the tool holder unintentionally.

It has surprisingly proved especially favorable to embody the entire bush as especially thin-walled and preferably to lend it a wall thickness <2.5 mm, and ideally <1.5 mm. This kind of thin-walled bush is overall so elastic that it brings precisely the optimal effect of the channels extending in the circumferential direction and at the same time also does not significantly reduce the chucking forces to be brought to bear relative to the tool shaft.

An especially major rationalization effect can be achieved if the invention is used not only for building individual tool holders but instead is built into a system for producing the described tool holders for chucking a tool shaft by frictional engagement, the tool shaft having different chucking characteristics. Expediently, such a system comprises a plurality of identically embodied main bodies of the tool holder and different bushes to be used with the main bodies of the tool holder. These bushes differ with regard to the structures machined into its outer circumferential surface and forming the channel and/or in the design of the clamping surface on their inner circumferential surface. In this way, one and the same main body of the tool holder can be very simply adapted to the most various requirements.

This adaptation can be made use of in the stage of tool holder production in that with little effort, merely by incorporating differently designed and thus differently resilient bushes, one or more tool holder model series, which have an incrementally graduated chucking characteristic, can be produced from main bodies of the tool holder that are always the same or differ only slightly.

The system concepts can be used even more efficiently if the bushes are each not fixed in final form in the main body of the tool holder but instead are fixed in the main body of the tool holder in such a way that the end user of the tool holder can replace them. This makes it possible for the end user, whenever he finds that the combination of tool holder and tool that he has chosen is not running optimally on the machine tool equipped with it but instead is tending to problematic vibration, he can simply equip the tool holder, under otherwise advantageously constant conditions, with a bush that lends it a significantly different chucking characteristic and therefore takes the complete system out of the critical vibration range.

The system concepts can also be expressed in method terms: Protection is also sought for the method of producing tool holders with different chucking characteristics by equipping main bodies of the tool holder, which are always the same or slightly different, with different bushes of the type according to the invention.

Once there are already grooved bushes at a different location in the circumferential direction, which have been installed for quite different purposes in the tool holder, protection is also sought within the scope of the invention for the use of different bushes, which on their outer circumference have a plurality of circumferentially extending, self-contained first grooves, or at least one first groove extending along a helical line in a plurality of windings around the outer circumference, and with their aid the chucking characteristic of a tool shaft is varied. The thus-designed bush is used for insertion and preferably durable fixation in a tool holder that later receives the tool, or for slipping on and preferably durably fixing on a tool shaft.

Expediently, such bushes, on their inner circumference, have a plurality of circumferentially extending self-contained second grooves or at least one second groove extending along a helical line in a plurality of windings about the outer circumference, and the second grooves are each located in the vicinity of the interstices between two first grooves, or the at least one second groove is located in the vicinity of the interstice between two windings of the at least one first groove.

Ideally, the depth of the first groove or grooves is selected such that the wall portion spanning the groove comes to rest against the inner circumference of the tubular portion, if the operating forces exceed a defined magnitude.

Preferably, in such a bush, the depth measured in the radial direction of a first groove or grooves is very slight, namely in the ideal case <0.1 mm and even better <0.075 mm.

It has proved especially favorable if the depth, measured in the radial direction, of the second groove or grooves is <1 mm, even better <0.5 mm and in the ideal case <0.1 mm.

The production of the bush from a material, ideally a metal material, that has a higher damping than the conventional tool seal has proved especially favorable. The metal alloy sold under the trademark "Star Silent" by the firm Daido Steel, 2-30, Daido cho, Minami-ku, Nagoya, 457-8545 Japan is especially suitable.

It is not absolutely necessary to use the bush, representing one embodiment of the invention, in special tool holders that are dimensioned such that they can additionally receive the bush. Instead, the invention can especially be used for the sake of retrofitting in such a way that the respective shaft of the metal-cutting tool is provided with the bush—in the manner described in the corresponding claims.

The tool collet chucks designed according to the invention are predestined for being combined with Applicant's "Safelock Technology", which is described in further detail for instance in European Patent EP 2 004 351 B1, the entire content of which is hereby incorporated by reference in the present application. Briefly, safelock technology is distinguished in that the tool shaft chucked by nonpositive engagement is additionally fixed by positive-engagement elements, which engage one or more helical grooves in the tool shaft. Safelock technology prevents the tool from being unintentionally pulled out, especially as a result of the microscopic creeping motions that occur in high-performance cutting (HPC). To prevent that, precisely there it can be of increased practical significance where the tool shafts are held in a press fit not directly by the surface of a tube part fixedly joined to the remainder of the tool holder, but by, the depth (T2), measured in the radial direction, of a second groove is <1 mm, even better <0.5 mm and in the ideal case <0.1 mm.

Since the invention is significant not least for high-performance cutting, it preferably comes to be used together with a tool cooling system of the kind described in International Patent Application WO 2010/022875, the entire content of which is hereby incorporated by reference into this application.

Further advantages, embodiment options, and modes of operation will become apparent from the exemplary embodiments described below with reference to the drawings, the entire drawing disclosure content of which is essential to the invention.

BRIEF DESCRIPTION OF THE DRAWINGS

FIG. 1 shows an overview of the first exemplary embodiment.

FIG. 2 shows a section through the tube part of the first exemplary embodiment.

FIG. 3 shows a detail of FIG. 2.

FIG. 4 shows an overview of the second exemplary embodiment.

FIG. 5 shows a section through the tube part of the second exemplary embodiment.

FIG. 6 shows a detail of FIG. 5.

FIG. 7 shows a section along the axis of rotation through a collet, which represents a third exemplary embodiment of the invention and which is distinguished by the channels machined integrally into it.

FIG. 8 shows a view of the collet of FIG. 7 from the front.

FIG. 9 shows a front view of a collet which represents a fourth exemplary embodiment; this is a collet with a bush thrust into it.

FIG. 10 shows a vertically extending section through the collet of FIG. 9.

FIG. 11 shows the collet of FIG. 9 in a different position.

FIG. 12 shows a vertically extending section through the collet of FIG. 11.

FIG. 13 shows an enlarged detail of the tube part that can be seen in FIGS. 10 and 12.

FIG. 14 shows a front view of a collet, which represents a fifth exemplary embodiment of the invention; this is a collet with an inserted bush of a different design.

FIG. 15 shows a vertically extending section through the collet of FIG. 14.

FIG. 16 shows the collet of FIG. 14 in a different position.

FIG. 17 shows a vertically extending section through the collet of FIG. 16.

FIG. 18 shows an enlarged detail of the tube part that can be seen in FIGS. 14 and 16.

FIG. 19 shows a very greatly enlarged detail of the bush of the invention;

this detail is preferably representative of all the bushes described in the exemplary embodiments, including the bushes that are shown in FIGS. 20 and 21.

FIG. 20 shows the axial section through a milling cutter that is equipped with the bush of the invention.

FIG. 21 shows a side view of the milling cutter of FIG. 20.

DETAILED DESCRIPTION OF THE PREFERRED EMBODIMENTS

FIG. 1 shows a tool holder 1 in the form of a shrink-fit chuck. The reference symbol L designates the axis of rotation of the tool holder about which the tool holder rotates when being used as intended.

Shrink-fit chucks are capable of chucking the shafts of tools in especially hard fashion, depending on the structural type. In many cases this is advantageous, but in all those cases in which a softer chucking is opportune, the shrink-fit chucks are especially predestined for the use of the invention.

As can be seen best from FIGS. 2 and 3, this tool holder 1 has a tool receptacle 3 in the interior of its tube part 4.

The tube part 4 in this exemplary embodiment is not embodied in one piece; instead, it comprises the tubular portion 5, usually embodied as an integral component of the tool holder 1, and the bush 6 retained in this tubular portion 5.

As a rule, this bush 6 is inseparably joined to the tubular portion 5, for instance by a weld seam, not shown in the drawings, which connects the free face end of the bush 6 to the face end of the tubular portion 5.

The bush 6 is provided on its outer circumference with a plurality of first annular grooves 7, preferably continuous in the circumferential direction, which are each separated from one another by an annular land 8. The annular grooves are self-contained. As soon as the bush 6 is mounted as intended in the tubular portion 5, the bush 6 and the tubular portion 5 together form a tube part 4, which has a recess in the material in the form of a plurality of corresponding annular channels 9. See particularly FIG. 3. It shows that the annular channels 9 formed definitively by the first annular grooves 7 are each separated from the actual tool receptacle by a wall portion 10 that yields resiliently in the radial direction. This wall portion closes the annular channels 9 off from the tool receptacle, so that there is no direct connection between the annular channels 9 and the circumferential surface of the tool shaft to be chucked; instead, there is a separation by the aforementioned wall portion 10.

Because the wall portions 10 are yielding in the radial direction, the tool shaft is more softly chucked. Unlike channels or bores that extend for instance essentially in the direction parallel to the axis of rotation L in the tube part, the uninterrupted, circumferentially extending annular channels 9 ensure that the rigidity with which the tool shaft is chucked relative to the forces exerted on it in operation is identical in all directions and therefore not dependent on the rotary position at the time of the tool holder. According to the invention, this provides for especially quiet operation.

In this exemplary embodiment, it is especially favorable that the inner circumferential surface of the bush 6 is not a continuously uniform cylindrical jacket face. Instead, on its inner circumferential surface, the bush 6 also bears annular grooves in the form of the second annular grooves 11. Between them, they form annular clamping surfaces 12, which as intended rest against the circumference of the tool shaft. They fix the tool shaft by nonpositive engagement and thus transmit at least the predominant portion of the torque, to be exerted in operation, to the tool shaft.

Preferably, the clamping surfaces 12 are positioned and designed in a defined manner, namely as shown also in FIG. 3, but see also FIG. 19.

The clamping surfaces 12 are each embodied on the inner circumference of a resiliently yielding wall portion 10. The applicable clamping surface 12 is thus entirely surrounded in the circumferential direction by a cavity in the form of the channel 9, and thus is "hollow" and is therefore capable of escaping or moving elastically resiliently in the radial direction.

The various dimensions that are relevant to the channels of the invention and the bush of the invention can be best explained in conjunction with FIG. 19:

Preferably, the width BS, measured parallel to the axis of rotation L, of each of the clamping surfaces 12 is less than the width B1, measured in the same direction, of the respective channel 9 formed by a first groove 7, which channel spans the elastic wall portion 10.

As can be seen, the bush is embodied in thin-walled fashion; its wall thickness W is preferably less than 2.5 mm and even better less than 1 mm.

It is especially favorable for each of the channels 9, or at least the predominant number of the channels, to be embodied such that the width B1 of the applicable channel 9 is substantially greater than the depth T1 measured in the radial direction. In such an embodiment, the resiliently yielding wall portion 10 can as needed be compressed until it is virtually a block; that is, whenever in operation, for whatever reason, especially strong forces must be exerted suddenly, the resiliently yielding wall portion 10 can be braced in the radially outward direction. This prevents the chucking of the tool shaft from becoming too soft to be capable of withstanding all the loads occurring in operation.

As best seen in conjunction with FIG. 2, the tool holder adjoining the bush 6 is preferably provided with the safelock thread structure 13 already mentioned above.

FIG. 4 shows a further tool holder 1 in the form of a shrink-fit chuck. The base body of this tool holder is equivalent to the tool holder shown in FIG. 1. In this exemplary embodiment as well, the tube part 4 is not embodied in one piece.

In a distinction from the first exemplary embodiment just described, the tool holder here is equipped with a bush that, with the first grooves mounted on its outer circumference, does not form a plurality of channels, each self-contained in the circumferential direction, but instead two continuous channels 9 extending uninterruptedly, which each wind more than three times around the tool receptacle opening, each along its own helical line. Here, the channels 9 thus form an arrangement that can be called a two-course thread.

In this embodiment as well, the annular channels 9 are each separated from the actual tool receptacle by a wall portion 10 that yields resiliently in the radial direction and closes off the annular channels 9 from the tool receptacle.

Here again, the resiliently yielding wall portion bears the actual clamping surface 12, so that once again the clamping surface is "hollow". Thus in this exemplary embodiment, there are two clamping surfaces, which here, however, in contrast to the first exemplary embodiment, are not embodied in the form of a plurality of circular rings, but in the form of two helical lines, which are arranged in the manner of a two-course thread and likewise wind several times around the axis of rotation L of the tool holder.

Preferably, in this exemplary embodiment as well, the width BS, measured parallel to the axis of rotation L, of each of the clamping surfaces 12 is less than the width B1, measured in the same direction, of the channel 9 that spans the wall portion 10; again, see FIG. 19 that is representative for this exemplary embodiment as well.

Because of the provisions just described, the chucking of the tool shaft is softer, in this exemplary embodiment as well.

With regard to the dimensioning of the channels 9 or (when a bush is used) of the first and second grooves 7, 11 and of the clamping surfaces 12 as well as the wall thickness W of the bush 6, what is said above for the first exemplary embodiment logically applies to the second exemplary embodiment as well.

FIGS. 7 and 8 show a third exemplary embodiment of the invention, which, however, is used here not to vary the chucking characteristic of a shrink-fit chuck but rather to vary the chucking characteristic of a collet 15. This collet is press-fitted by a cap nut in the direction of the axis of rotation L into a conical seat engaging its outer circumference and thus keeps the tool shaft in a force fit.

Advantageously, here again the collet is equipped with the safelock thread structure 13 already mentioned above.

The channels 9 of the invention, in this exemplary embodiment, are embodied in the form of a plurality of circular-annular channels extending in the circumferential direction, which—as in the first exemplary embodiment—are closed off toward the side of the tool receptacle by resiliently yielding wall portions 10. The channels are cut into by the slits 14, extending through the wall of the collet 15 and lending it the requisite compressibility, but otherwise are self-contained. Unless the ensuing explanation of the special features of this exemplary embodiment says otherwise, the channels 9, the resiliently yielding wall portions 10, and the clamping surfaces 12 are preferably embodied, located and dimensioned as described above for the first exemplary embodiment; see again FIG. 19, whose illustration applies here accordingly.

The special feature of this exemplary embodiment is that the channels of the invention are not produced here with the aid of a bush that is thrust into the collet and fixed there, but instead that the channels are embodied integrally in the one-piece collet.

Such an embodiment of the channels can be accomplished more simply by producing the collet using a powder metallurgical method.

FIGS. 9 through 13 show a fourth exemplary embodiment of the invention. In this exemplary embodiment as well, the invention is used to vary the chucking characteristic of a collet 15.

However, this exemplary embodiment is closely related to the first exemplary embodiment, because here again, the channels 9 of the invention are produced in such a way that the bush 6, already described in detail in conjunction with the first exemplary embodiment, and which on its outer circumference bears first grooves 7, is inserted into a collet 15 instead of into a shrink-fit chuck. As in the first exemplary embodiment, the bush is self-contained in the circumferential direction, and thus has no lengthwise slit.

For the location, embodiment and dimensioning of the channels, the resilient wall portions, and the clamping surfaces, what is said for the first exemplary embodiment is also applicable.

Here, the thin-walled nature of the bush 6 already described above has an especially favorable effect, which ensures that the retention force of the collet is not significantly reduced, even though the bush 6 has no longitudinal slit.

FIGS. 14 through 18 show a fifth exemplary embodiment of the invention.

This exemplary embodiment is closely related to the second exemplary embodiment, because the channels 9 of the invention are produced here in such a way that the bush 6, already described in detail in conjunction with the second exemplary embodiment, is inserted into a collet 15 instead of into a shrink-fit chuck. For the location, embodiment and dimensioning of the channels, the resilient wall portions, and the clamping surfaces, what is said for the second exemplary embodiment therefore applies as well.

Here again, the thin-walled nature of the bush 6 has a favorable effect.

FIGS. 20 and 21 show that the invention can easily also be put to use retroactively, without having to make changes in the tool holders.

For that purpose, the bushes 6 already used in the context of the exemplary embodiments described above are used, which are preferably also designed as already described above, and in particular regarding the design of the grooves 7 and 11, the resilient wall portions 10, and the clamping surfaces 12. The bushes 6 can have a plurality of circumferentially extending grooves 7 and 11 on the outside and optionally on the inside, respectively, or instead can have the spiral groove or grooves also described above.

Expediently, such a bush 6 is fixed on the tool shaft 17 permanently by shrink-fitting and/or local welding.

The bush 6 here is dimensioned such that after the fixation it has a maximum outside diameter that is at least essentially or preferably entirely equivalent to one of the current rated diameters for tool shafts to be chucked in tool holders, so that the tool provided with the bush can be routinely chucked into one of the standard tool holders.

To achieve this, the tool shaft, on its end remote from the tool cutting edges, can have a portion of reduced diameter, so that a bush whose maximum outside diameter is equivalent to the actual shaft diameter of this tool can be thrust onto the tool shaft.

Alternatively, the bush is thrust onto the tool shaft the diameter of which is not reduced and is then dimensioned such that its maximum outside diameter, after the fixation, is equivalent to the rated shaft diameter of a larger tool, so that the tool together with the bush can be inserted into the standard tool holder actually intended for this larger tool, without having to make changes to the tool holder.

In general it should be noted, as an example in terms of the bush shown in FIG. 19 but applying to all the exemplary embodiments, that by suitable design of the bush, the vibration and damping behavior can be varied and adapted. This can happen above all by means of the positioning and dimensioning of the annular grooves 7 and 11.

In FIG. 19, the grooves are made such that a clamping surface 12 is created that is located entirely above the groove 7. By changing the width and depth of the grooves 7 and 11, the rigidity of the bush can be varied. The narrower the clamping surface 12 becomes, and the more the clamping surface 12 is positioned only in the area of the middle of a groove 7, the softer clamping becomes. Conversely, the clamping can become harder if the clamping surface 12 is so wide that it fits all the way over the groove 7 and goes beyond the groove at the edges and is not hollow there.

The grooves 7 and 11 can furthermore overlap one another in such a way that the clamping surface 12 is braced on two adjacent grooves 7. As a result, a relatively soft and resilient clamping can be achieved, in any case whenever the two adjacent grooves are very close together.

The invention claimed is:

1. A tool holder having a tool receptacle for chucking a tool shaft by frictional engagement, the tool receptacle comprising:
a plurality of annular clamping surfaces spaced apart from one another, which are intended for retaining the tool shaft by nonpositive engagement and are embodied on an inner circumference of a tube part, and the tube part has a recess in a material for varying its clamping action, and the recess in the material is embodied by a plurality of annular channels extending in a circumferential direction, which are each separated from the tool receptacle by a resilient wall portion, which on its side facing away from a respective channel embodies a respective clamping surface, wherein a depth of each channel, measured in a radial direction, is <0.1 mm, and with increasing load, the resilient wall portion braces itself on a tube part located behind the resilient wall.

2. The tool holder of claim 1, wherein the resilient wall portion is thin-walled in the radial direction and has a wall thickness <2 mm, and in addition a width of the channel that is spanned by the resilient wall portion, which separates the channel from the tool receptacle, is greater, by at least 25%, than a width of the clamping surface that is embodied on the resilient wall portion, in each case viewed in a direction of a longitudinal axis of the tool holder.

3. The tool holder of claim 2, wherein the width of the respective channel, measured in a direction of an axis of rotation, is greater by a factor of at least 10 than the depth of the channel measured in the radial direction.

4. The tool holder of claim I, wherein the depth of each channel, measured in the radial direction is <0.075 mm.

5. The tool holder of claim 1, wherein the tube part is embodied in two parts and comprises one tubular portion and a bush fixed in the tubular portion, and one or more grooves that definitively form the channels are machined in an outer circumferential surface of the bush.

6. The tool holder of claim 5, wherein the channels are filled with a substance selected from the group consisting of: a nonferrous metal, copper, a nonmetal, plastic, a fluid, and oil.

7. The tool holder of claim 5, wherein the bush is produced from a high-damping metal.

8. The tool holder of claim 5, wherein the bush, on its face end toward a free end of the tool holder, is welded to the tool holder, and the bush is thin-walled and has a wall thickness <2.5 mm.

* * * * *